Dec. 24, 1935. C. R. BROWNLOW 2,025,330
SAW GUIDE
Filed May 5, 1934
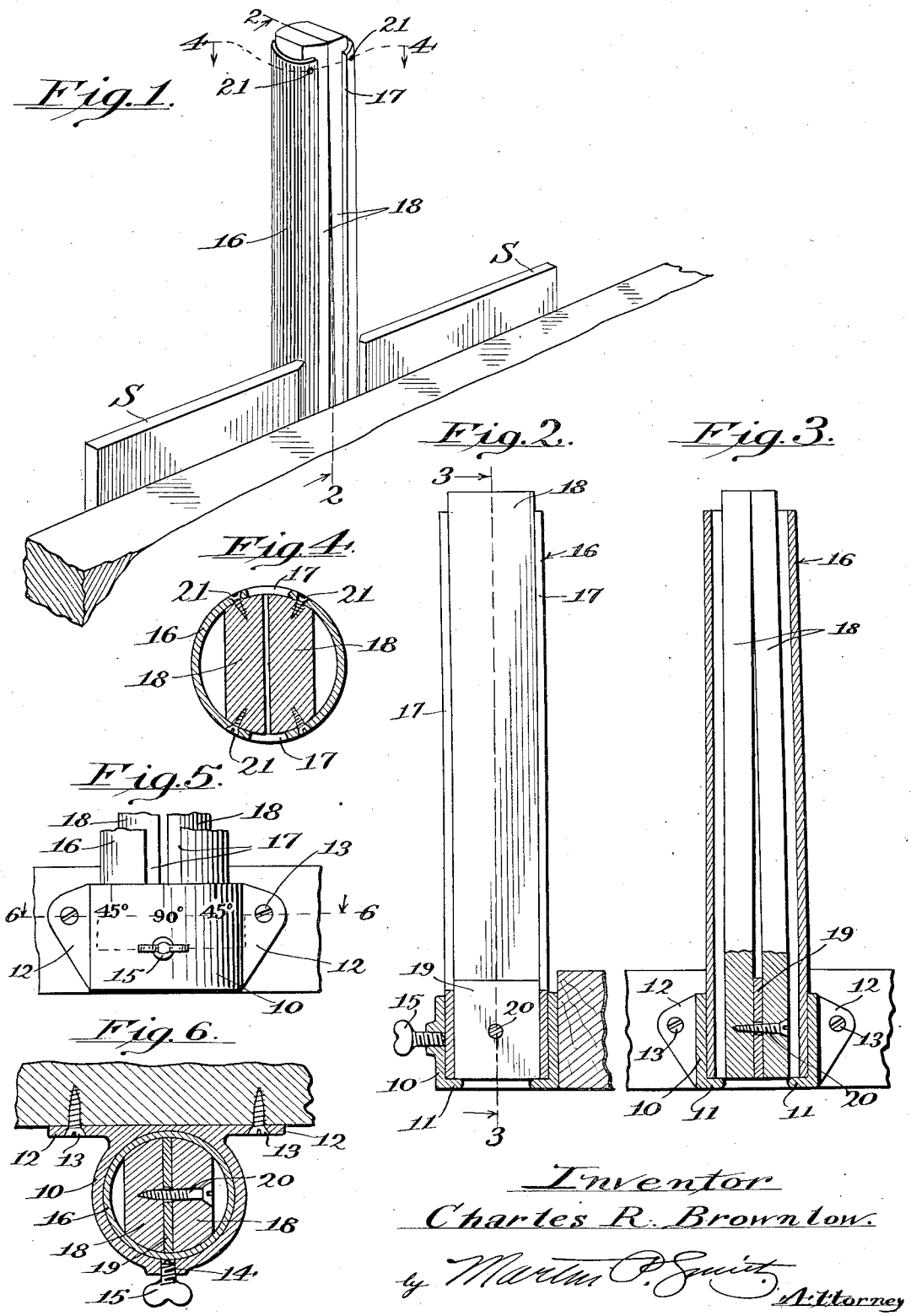
Inventor
Charles R. Brownlow Patented Dec. 24, 1935

2,025,330

UNITED STATES PATENT OFFICE 2,025,330

SAW GUIDE

Charles R. Brownlow, Los Angeles, Calif.

Application May 5, 1934, Serial No. 724,086

4 Claims. (Cl. 143—86)

My invention relates to a saw guide and has for its principal object, the provision of a relatively simple, practical and inexpensive device that may be conveniently mounted on a work bench, saw horse or angle frame and which functions as a guide for a hand saw while the same is being used for sawing pieces of wood or the like and particularly for the sawing of a piece of wood at an angle to provide miter joints.

Further objects of my invention are, to provide a saw guide comprising a vertically disposed cylindrical member mounted for rotation in a bracket that is secured to a work bench, saw horse or other frame, said member having a pair of wooden strips that serve as a guide for the saw during its reciprocating movement and the base or bracket in which the upright member is mounted for rotation being provided with simple and efficient means for clamping and holding said upright member in differently adjusted positions so that the saw may be conveniently used in making angular cuts across the work.

Further objects of my invention are, to provide a saw guide of the character referred to that is very compact and occupies comparatively little space when packed for storage or transportation and which saw guide is constructed so as to hold the saw in an out-of-the-way position on the rear side of the bench or work table while the saw is not being used.

With the foregoing and other objects in view my invention consists in certain novel features of construction and arrangements of parts that will be hereinafter more fully described and claimed and illustrated in the accompanying drawing in which:

Fig. 1 is a perspective view of a saw guide of my improved construction in position for use on a work bench or the like.

Fig. 2 is an enlarged vertical section taken on the line 2—2 of Fig. 1.

Fig. 3 is a vertical cross section taken on the line 3—3 of Fig. 2.

Fig. 4 is an enlarged horizontal section taken on the line 4—4 of Fig. 1.

Fig. 5 is an elevational view of the bracket that is attached to the work bench and which serves as a support for the upright rotary saw guide.

Fig. 6 is a horizontal section taken on the line 6—6 of Fig. 5.

Referring by numerals to the accompanying drawing which illustrates a preferred embodiment of my invention, 10 designates the main body of the saw guide supporting bracket which is in the form of a short tube open at both ends and projecting inwardly from the lower end of the wall of this tubular body, is a narrow flange 11.

Formed integral with the body of the bracket, are outwardly projecting ears 12 that are perforated for the reception of screws 13 that are utilized in securing the bracket to the edge of a work bench, saw horse or other suitable support.

The wall of the bracket 10 is provided with a threaded aperture 14 for the reception of a set screw 15 that is utilized in clamping and holding the lower portion of the saw guide when positioned in the bracket.

Formed on the outer face of the upper portion of the wall of bracket 10, are guide marks that may be utilized in adjusting the saw guide so that the saw may make a through cross cut at ninety degrees or cuts at forty-five degrees for the purpose of forming a miter joint.

The body of the saw guide comprises a tube 16, preferably of a metal of such diameter as to fit within the bracket 10 and formed in the wall of said tube are longitudinally disposed diametrically opposite slots 17. These slots are open at the upper end of the tube and they terminate a short distance above the lower end of the tube.

Extending lengthwise through the tubular body 16, is a pair of saw guiding members 18, preferably of wood and which are spaced apart a sufficient distance to accommodate the blade of an ordinary hand saw.

A narrow spacing block or strip 19 of cardboard or wood is positioned between the lower portions of the guide members 18 and a screw 20 or like fastening device is utilized for rigidly connecting the lower portions of guide members 18, said screw passing through the central portion of spacing member 19.

The vertical edges of the guide members 18 fit directly against the inner surface of tube 16 adjacent the edges of the slots 17 and the upper portions of said guide members are secured to the wall of the tube 16 by screws 21 or like fastening devices.

The slot or kerf between the guide members 18 register with the slots 17 in tube 16 and said slots 17 are substantially wider than the slot or kerf between members 18 so that the teeth of the saw in passing between the guide members does not contact with the edges of the metal tube.

In the construction of the tubular member 16, the upper portions thereof are forced with pressure toward each other after the slots 17 have been formed in the tube so that under normal conditions the upper portions of the edges of the slots are positioned immediately adjacent each other and thus when the wooden guiding strips 18 are inserted in the tube they will spread the upper portions thereof apart so that the slots 17 are the same width throughout the height of the tube and due to the resiliency of the metal in the tube the inner faces of the upper portions of the guiding strips 18 will make direct contact with each other.

As a result of this construction and arrangement, the blade of the saw that passes through the slot or kerf between the guide strips 18 will be engaged with a certain degree of pressure that is effective in firmly holding the saw while the same is not in use.

In the use of my improved saw guide the molding or other wooden member to be cut, is placed on the surface of the work table immediately against upright stops S that are positioned on the edge of the table to the sides of the saw guide and the forward end of the saw is inserted in the lower portion of the slot or kerf between the guiding members 18, then slightly elevated and the saw may then be reciprocated in the usual manner to cut the molding or other work.

Previous to the cutting of molding or strips placed on the work bench in front of the saw guide, the upright member is rotated so as to hold the saw at the desired angle and said upright member is then firmly secured to the bracket 10 by tightening the set screw 15.

Thus it will be seen that I have provided a saw guide that is relatively simple in construction, inexpensive of manufacture and very effective in performing the functions for which it is intended.

The bracket 10 that supports the saw guide may be conveniently secured to a work bench, saw horse or other supporting frame and the upright member of the guide may be easily and quickly removed from or applied to the bracket.

The main body of my improved saw guide is very compact and occupies comparatively little space in a tool box or when packed for storage or transportation.

It will be understood that minor changes in the size, form and construction of the various parts of my improved saw guide may be made and substituted for those herein shown and described without departing from the spirit of my invention, the scope of which is set forth in the appended claims.

I claim as my invention:

1. In a saw guide, a tube of resilient metal provided with oppositely arranged longitudinally disposed slots, a pair of saw guiding members extending lengthwise through said tube to form a saw receiving slot that gradually decreases in width toward its upper end, the upper portions of the tube to the sides of the slot therein exerting pressure upon the saw guiding members so as to converge the same toward their upper ends and means for securing said saw guiding members to said tube.

2. In a saw guide, a tube of resilient metal provided with oppositely arranged longitudinally disposed slots, a pair of saw guiding members extending lengthwise through said tube the pressure of the upper portions of the tube to the sides of the slot therein exerting pressure against the saw guides to converge the same toward their upper ends, means for securing said saw guiding members to said tube and the slot or kerf between said saw guiding members communicating with the slots in said tube.

3. In a saw guide, a bracket having a socket, a slotted tube of resilient metal having its lower portion removably and adjustably mounted in the socket in said bracket and a slotted saw guide extending lengthwise through said slotted tube the pressure of the upper portions of the slotted tube to the sides of the slot therein exerting pressure on opposite sides of the saw guide to converge the same toward its upper end.

4. In a saw guide, a bracket having a socket, a slotted tube of resilient metal having its lower portion removably and adjustably mounted in the socket in said bracket, a slotted saw guide extending lengthwise through said slotted tube, the edges of the slot in the saw guide communicating with the slots in the tube and those portions of the slotted tube to the sides of the slots therein exerting pressure against the upper portions of the saw guide to converge same toward their upper ends.

CHARLES R. BROWNLOW.